United States Patent

Stepper et al.

[11] Patent Number: 5,165,271
[45] Date of Patent: Nov. 24, 1992

[54] SINGLE SENSOR APPARATUS AND METHOD FOR DETERMINING ENGINE SPEED AND POSITION

[75] Inventors: Mark R. Stepper; Thomas E. Kitterman, both of Columbus; Robert S. Strothmann, Seymour, all of Ind.

[73] Assignee: Cummins Electronics, Columbus, Ind.

[21] Appl. No.: 677,667

[22] Filed: Mar. 29, 1991

[51] Int. Cl.5 ............................................. G01M 15/00
[52] U.S. Cl. ..................................................... 73/116
[58] Field of Search .................. 123/617, 414; 73/116; 324/179, 174, 173

[56] References Cited

U.S. PATENT DOCUMENTS

| | | | |
|---|---|---|---|
| 4,338,813 | 7/1982 | Hunninghaus et al. | 73/116 |
| 4,356,447 | 10/1982 | Honig et al. | 324/173 X |
| 4,553,426 | 11/1985 | Capurka | 73/116 |
| 4,644,917 | 2/1987 | Yakawa et al. | 123/414 |
| 4,700,305 | 10/1987 | Lotterbach et al. | 364/431.03 |
| 4,797,827 | 1/1989 | Cockerham | 364/431.03 |
| 4,825,373 | 4/1989 | Nakamura et al. | 364/431.05 |
| 4,870,587 | 9/1989 | Kumagai | 364/431.07 |
| 4,889,094 | 12/1989 | Beyer et al. | 123/414 |
| 4,941,445 | 7/1990 | Deutsch | 123/414 |
| 4,959,996 | 10/1990 | Akasu | 73/116 |
| 4,972,818 | 11/1990 | Nomura et al. | 123/414 |
| 4,982,330 | 1/1991 | Karle et al. | 364/431.03 |
| 5,044,336 | 9/1991 | Fukui | 73/116 X |

FOREIGN PATENT DOCUMENTS 2836479 3/1979 Fed. Rep. of Germany ...... 123/414

OTHER PUBLICATIONS

"Pace" (no author or date given).
"Pace Technical Package", Gatewood, p. 6 (no date given).
"Pace Subsystem Design Specification", Ellison et al. Sep. 17, 1985, pp. 42 and 45.
Lannan, Sisson, and Wolber, "Cummins Electronic Controls for Heavy Duty Diesel Engines", IEEE 88 CH2533-8 (Oct. 1988).

Primary Examiner—Jerry W. Myracle
Attorney, Agent, or Firm—Woodard, Emhardt, Naughton, Moriarty & McNett

[57] ABSTRACT

A single sensor apparatus and method for determining engine position and engine speed is disclosed. The apparatus includes a gear rotating in synchronism with the camshaft of an internal combustion engine. The gear includes a number of equiangularly spaced teeth, and an additional tooth mechanically synchronized with top dead center position of a particular cylinder of the engine. An algorithm is disclosed for detecting the added tooth with a high reliability and accuracy. In addition, engine speed is determined by measuring the time interval required for a predetermined quantity of gear teeth to pass the sensor by detecting the pulses corresponding to the gear teeth. The resulting time interval is converted into engine speed through a known relationship between the number of teeth on the gear and their angular spacing.

14 Claims, 2 Drawing Sheets

SINGLE SENSOR APPARATUS AND METHOD FOR DETERMINING ENGINE SPEED AND POSITION

FIELD OF THE INVENTION

This invention relates to a position sensor suitable for use in an internal combustion engine control system, and more specifically to a single sensor system capable of determining engine speed as well as engine crankshaft or camshaft position.

BACKGROUND OF THE INVENTION

It is a well-known concept to employ a toothed wheel or gear having equiangularly spaced teeth on the engine crankshaft or camshaft in conjunction with a fixed sensor to provide a pulse train output signal as the toothed wheel rotates. The pulse train signal is used to provide information about the speed of the engine. In addition, angular position may also be determined by way of analyzing the pulse train signal to provide information with regard to a specific position or tooth which has just passed the sensor. The timing information which is derived therefrom is useful in controlling ignition timing as well as timing and fueling of fuel injection systems.

Numerous patented methods and devices are known for detecting engine position and speed. Cockerham, U.S. Pat. No. 4,797,827, discloses an angular position detector which includes a toothed wheel with a missing tooth and a single sensor providing a pulse train signal corresponding to the teeth of the wheel passing nearby. A missing tooth is used to determine engine position. Other patents incorporating the missing tooth technique for determining engine position include Karle et al., U.S. Pat. No. 4,982,330; Capurka, U.S. Pat. No. 4,553,426; and Nakamura et al., U.S. Pat. No. 4,825,373. Further, Kumagai, U.S. Pat. No. 4,870,587, combines the missing tooth detection scheme with the fact that the rotational speed of the crankshaft or camshaft after top dead center of a cylinder rises substantially relative to engine speed before top dead center in a compression stroke of the cylinder but does not rise in an exhaust stroke. Thus, the stroke of the engine is discriminated by determining the difference in rotational speed of the crankshaft before and after top dead center of a cylinder.

Another approach well-known in the art for detecting engine position and/or speed is to provide a toothed wheel wherein one of the teeth is altered slightly in shape or phase relationship with regard to the remaining gear teeth to produce an identifiable position signal thereby indicating relative position of the camshaft or crankshaft of the engine. Specifically, Lotterbach et al., U.S. Pat. No. 4,700,305, discloses a device for controlling a vehicle engine computer using a segmental disk transducer for indicating a specific marker angular position of the crankshaft. The segmented disk includes uniformly spaced segments thereon wherein the number of segments corresponds to the number of cylinders. One of the segments is foreshortened, so that the passage of the leading flank thereof past a stationary pickup transducer will occur at a time later than that of the leading edges or flanks of the remaining segments. Deutsch, U.S. Pat. No. 4,941,445, discloses an electronic position sensor assembly and engine control system wherein two sensing elements in a dual sensor provide separate and independent position signals related to a multi-cylinder engine cycle position. Reference signals for determining engine position are generated in accordance with several extra-large teeth located on a rotating toothed wheel. Akasu, U.S. Pat. No. 4,959,996, discloses a control signal generator for an internal combustion engine. The toothed wheel disclosed in Akasu is substantially similar to that shown in Lotterbach et al.

Other prior art concepts for determining position and speed of an internal combustion engine are disclosed in Normura et al., U.S. Pat. No. 4,972,818, and Beyer et al., U.S. Pat. No. 4,889,094. Normura et al. discloses a toothed wheel having several missing teeth and phase shifted teeth whereas Beyer et al. discloses a toothed wheel having one tooth which is not notched or split to provide a special timing position signal.

Systems which incorporate the missing tooth approach rely upon detection of the remaining teeth in order to establish the approximate position of the missing tooth for timing purposes. Such an approach will at times produce undesirable timing results during acceleration or deceleration of the engine when the timed projected occurrence of the missing tooth must be estimated by the engine control system.

A more reliable and highly accurate position and speed sensor for use with an internal combustion engine is needed.

SUMMARY OF THE INVENTION

A position and speed sensing apparatus according to the present invention for use with an internal combustion engine having a camshaft, the apparatus comprises a tone wheel adapted to rotate in synchronism with the camshaft and having a plurality of equiangularly spaced teeth, the tone wheel further having an additional tooth situated between an adjacent pair of the plurality of equiangularly spaced teeth, sensor means situated in close proximity to the tone wheel, the sensor means producing a pulse signal as each of the teeth and the additional tooth of the tone wheel pass near the sensor means, circuit means responsive to the pulse signals for producing a reference timing signal indicative of the additional tooth passing near the sensor means, and wherein the additional tooth is mechanically synchronized with a predetermined reference position of the engine.

A method for determining engine speed and position of an internal combustion engine according to another aspect of the present invention comprises the step of (a) providing a rotating member which rotates in synchronism with the camshaft of the engine, and the rotating member including a plurality of equiangular projections and an additional projection situated between adjacent equiangularly spaced projections, (b) detecting the equiangular projections and the additional projection as they pass a fixed reference location and producing a series of pulse signals in response to the passage of each of the projections, (c) producing a timing reference signal when the additional projection and a subsequent one of the equiangular projections passes said reference location, and (d) producing a speed signal corresponding to the speed of the engine in response to the pulse signals.

One object of the present invention is to provide an improved engine speed and position sensing apparatus.

Another object of the present invention is to provide improved accuracy with regard to engine position detection in order to control a fuel injected internal combustion engine.

Another object of the present invention is to detect top dead center timing during low engine speed conditions when engine speed fluctuations are more pronounced in response to the occurrence of compression and power strokes during cold start conditions.

A further object of the present invention is to provide a speed and position transducer which can be readily associated with a computer to generate output signals based on signals derived from the sensor, and provide critical timing information with regard to engine control systems, particularly fuel injection systems.

DESCRIPTION OF THE PREFERRED EMBODIMENT

Figure 1:
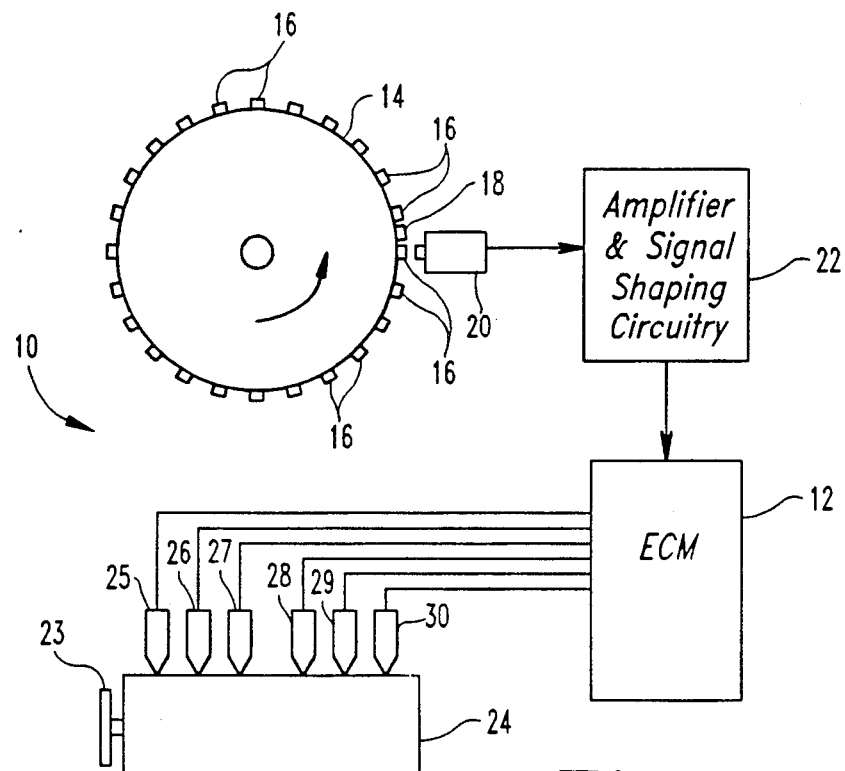
FIG. 1 is a diagrammatic illustration of the speed and position sensing apparatus according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a diagrammatic illustration of the engine speed and position sensing apparatus 10 according to the present invention is shown. Engine control module or ECM 12 is a microcomputer-based control system including RAM, ROM, EEPROM, analog I/O and digital I/O. Gear 14 includes a plurality of teeth 16 (24 total) which are equiangularly spaced about the perimeter of gear 14. Further, an additional tooth 18 is situated precisely between two of the equiangularly spaced teeth 16. As gear 14 rotates in the direction of the arrow, a variable reluctance sensor (or Hall effect sensor) 20 supplies a signal to amplifier and signal shaping circuitry 22 corresponding to the passing of the gear teeth 16 and 18. Tooth 18 is located so that its passing indicates that a particular subsequent tooth approaching sensor 20 will be the tooth corresponding to top dead center of a particular reference cylinder of engine 24. One possible approach is to use the first tooth following the reference tooth 18 as the position reference tooth. In addition, if the number of teeth 16 (here twenty-four) is a fixed multiple of the number of cylinders of engine 24, then every fourth tooth, for example, indicates or signals the occurrence of top dead center of a predetermined cylinder in a six cylinder engine. Since gear 14 is located on the camshaft of the engine 24 and rotates in synchronism with the crankshaft 25 of engine 24, each passing of tooth 18 past sensor 20 signals that the top dead center position of a reference cylinder in the compression stroke (usually cylinder No. 1) is about to occur. This reference information is critical in a fuel injected system since fuel injectors 25–30 require precise timed signals supplied thereto (from ECM 12) in order to appropriately control fuel injection quantities as well as timing of fuel injection with respect to the operation of a diesel engine.

Operationally speaking, as the teeth of gear 14 pass in close proximity to sensor 20, increased magnetic coupling occurs between the gear teeth 16 and 18 and sensor 20. The periodic signal produced by sensor 20 corresponding to gear teeth 16 and 18 passing near sensor 20 is supplied to an input of amplifier and signal shaping circuitry 22. Circuitry 22 amplifies the signal received from sensor 20 and transforms the signal into a squared-up pulse train signal which is supplied to an input of ECM 12. ECM 12 analyzes the signal from circuitry 22 to determine engine speed and engine position, be it crankshaft or camshaft position. It should be noted that there are 25 total teeth on gear 14, and thus the ECM may count the passage of 25 teeth by sensing 25 pulses from circuitry 22 to determine engine speed. Alternatively, ECM 12 may sense the passage of the extra tooth 18 and then measure the time required for 4 of the teeth 16 to pass sensor 20 by analyzing the signal from circuitry 22. The time for 4 teeth to pass will correspond with a predetermined angular rotation of the engine, and thus may be used in calculating or determining engine speed. More particularly, since there are 24 equiangularly spaced teeth 16 on gear 14, and since gear 14 rotates in synchronism with the camshaft of engine 24, the passage of 12 teeth corresponds to one revolution of the crankshaft, and the passage of 4 teeth corresponds to one-third revolution of the crankshaft of engine 24. Such calculations are well-known in the art of speed sensing and need not be further discussed herein.

Figure 2:
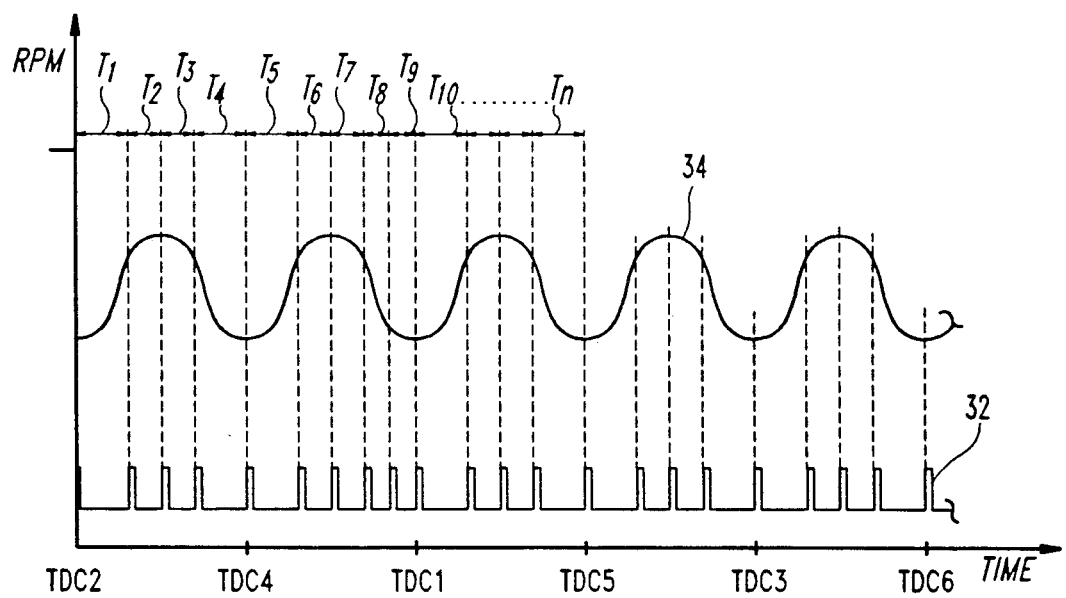
FIG. 2 is an idealized plot of an engine RPM curve versus the sensor output signal curve and depicting the timing relationship of the two curves.

Referring now to FIG. 2, the output signal of circuitry 22 supplied to ECM 12 is shown as curve 32, and the RPM deviation of engine 24 is depicted by idealized curve 34. In addition, a number of time periods labeled $T_1$-$T_n$ are shown depicting the relative time deviation between leading edges of pulses in curve 32. Labeled across the horizontal axis of the graph are the locations in time where top dead center of the various cylinders of engine 24 will occur. Particularly, top dead center of cylinder No. 1 labeled TDC1 occurs at the beginning of time $T_{10}$. The beginning of time $T_{10}$ is signaled by detection of the gear tooth 16 which immediately follows tooth 18 as gear 14 rotates. In view of the fact that the speed of the engine varies slightly and the speed variations are more pronounced in the lower engine speeds, the time deviations measurable between the passing of adjacent gear teeth are used to determine when tooth 18 has passed sensor 20.

ECM 12 includes hardware and software for detecting the leading edge of each of the pulses of curve or waveform 32 and continuously maintains an array of values in memory corresponding to a fixed quantity of the most recent of time periods $T_1$-$T_{10}$ up through $T_n$ representing actual timing information. Thus, as each tooth of gear 14 passes sensor 20, ECM 12 detects the leading edge of the pulse generated in response thereto and determines a time period measured between the current pulse received from circuitry 22 and the previous pulse received. It should be noted that ECM 12 need only store in memory the four most recent timed periods ($T_1$-$T_n$) defined by the most recent pulses of curve 32 for purposes of RPM of RPM and position detection.

Figure 3:
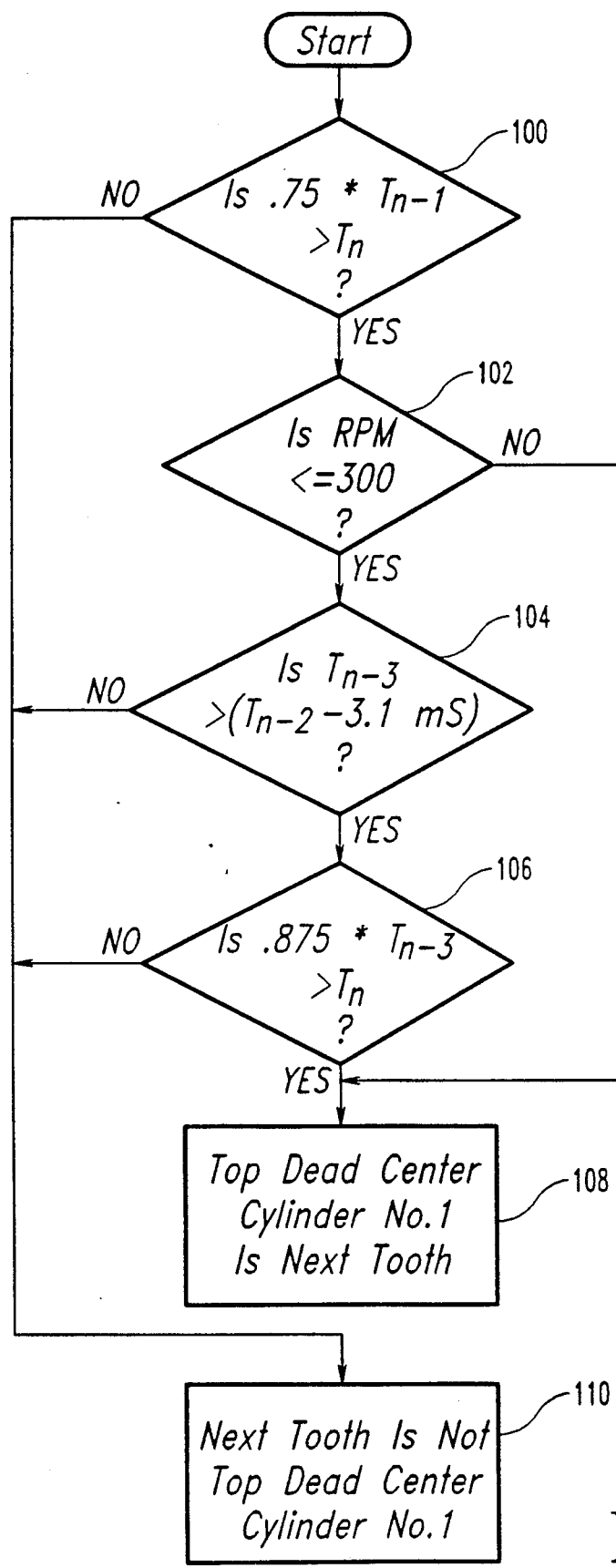
FIG. 3 is a flowchart for the software algorithm used to determine engine position.

Referring now to FIG. 3, a flowchart for the software algorithm used to detect engine position is shown.

This flowchart represents the functional algorithm of a software subroutine which executes each time a timing pulse of curve 32 is detected by ECM 12. At step 100, program executed by ECM 12 tests to determine whether the time period $T_{n-1}$ times 0.75 is greater than the time period $T_n$. If so, program execution will continue at step 102. If the answer to the test in step 100 is no, the program determines that the next tooth is not the top dead center of cylinder No. 1 in step 110 and program execution will return to the calling routine. At step 102, the microcomputer of ECM 12 determines whether or not the RPM determined for engine 24 is less than or equal to 300 RPM. If this test is true, then program execution will continue at step 104. If the test is not true, indicating that engine RPM is greater than 300 RPM, then program execution continues with step 108 wherein the microcomputer determines that top dead center of cylinder No. 1 will correspond with the occurrence or detection of the next tooth of gear 14 at step 108. However, if the answer to the test of step 102 is yes, program execution will continue with step 104 wherein the time period for $T_{n-3}$ is compared with the difference between $T_{n-2}$ and 3.1 milliseconds. If $T_{n-3}$ is greater than ($T_{n-2}$ minus 3.1 milliseconds), then program execution will continue at step 106. Conversely, if at step 104 the result of the test is an answer of "no", then program execution continues with step 110. Lastly, a final check at step 106 is made to compare the product of 0.875 and $T_{n-3}$ with $T_n$. If the product of 0.875 and $T_{n-3}$ is greater than $T_n$, then the next tooth detected will be top dead center of cylinder No. 1 at step 108. However, if the test at step 106 results in an answer of "no", then program execution will continue at step 110.

Referring now to FIGS. 2 and 3, the algorithm of FIG. 3 is designed specifically to detect the occurrence and sequence of time periods labeled $T_5$-$T_8$. On occasion, the time periods $T_5$ and $T_6$ will satisfy the test in step 100. However, the tests set forth in steps 104 and 106 provide further discrimination, if necessary, to determine the position of the engine. For example, $T_6$ is quite frequently less than 75 percent of $T_5$ during cold temperature low RPM conditions. However, the tests in steps 104 and 106 provide further discrimination and prevent false identification of the reference position tooth 18. Above approximately 300 RPM engine speed, the test in step 100 is the only test necessary to determine when top dead center of cylinder No. 1 will occur. The tests of steps 104 and 106 confirm the rising edge of the waveform from circuitry 22 for time period $T_{n-3}$ and time period $T_{n-2}$ versus time period $T_n$ which must be much shorter than time period $T_{n-3}$. The tests in steps 100, 104 and 106 are not satisfied in all other cases other than the one denoted by time periods $T_5$-$T_8$ in FIG. 2.

Due to the increased magnetic coupling effect between tooth 18 and immediately adjacent teeth 16, the rising edge of the pulse defining the beginning of period $T_{10}$ occurs sooner than expected. Such a result occurs when sensor 20 is a V/R sensor, but may not occur if sensor 20 is a Hall effect sensor. Software compensation techniques correct this phenomenon in determining injection timing, injection fueling and RPM calculations.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for determining engine speed and position of an internal combustion engine comprising the steps of:
    (a) providing a rotating member which rotates in synchronism with the camshaft of the engine, said rotating member including a plurality of equiangular projections and an additional projection situated between adjacent equiangularly spaced projections;
    (b) detecting said equiangular projections and said additional projection as they pass a fixed reference location and producing a pulse signal in response to the passage of each of said equiangular and said additional projections;
    (c) producing a timing reference signal in accordance with detection of a predetermined one of said equiangular projections following detection of said additional projection, said producing a timing reference signal step including the steps of:
        (1) measuring the four most recent time intervals between said pulse signals as $T_n$, $T_{n-1}$, $T_{n-2}$, and $T_{n-3}$, wherein $T_n$ is the most recent time interval measured;
        (2) determining that the next pulse detected does not correspond with an equiangular projection immediately following a pulse corresponding to said additional projection if $T_{n-1}$ is substantially larger than $T_n$;
        (3) producing a timing reference signal upon detection of a subsequent one of said pulses if said speed signal is greater than a predetermined speed limit, that $T_{n-3}$ is greater than ($T_{n-2}$-a predetermined time value), and that the product of $T_{n-3}$ and a predetermined factor is greater than $T_n$; and
    (d) producing a speed signal corresponding to the speed of the engine in response to the pulse signals.

2. The method of claim 1 wherein said rotating member includes 24 equiangular projections.

3. The method of claim 2 wherein said predetermined time value is approximately 3.1 mS, said predetermined speed limit is approximately 300 RPM, and said predetermined factor is approximately 0.875.

4. The method of claim 1 wherein the quantity of said equiangular projections is evenly divisible by the quantity of cylinders in said engine to produce a predetermined value and wherein said step of producing a speed signal includes the steps of (a) determining an elapsed time between the first in a series of said pulse signals and the last in a series of said pulse signals wherein the quantity of said pulse signals analyzed in said series of pulse signals is at least said predetermined value, and (b) comparing said elapsed time to a predetermined angular displacement of said engine necessary to produce said series of said pulse signals and calculating engine speed therefrom.

5. A position and speed sensing apparatus for use with an internal combustion engine having a camshaft, said apparatus comprising:
    a tone wheel adapted to rotate in synchronism with the camshaft and having a plurality of equiangularly spaced teeth, said tone wheel further having an additional tooth situated between an adjacent pair of said plurality of equiangularly spaced teeth, wherein said additional tooth is mechanically synchronized with a predetermined rotational reference position of the engine and wherein the quantity of said equiangular spaced teeth is an even multiple of the number of cylinders of the engine;

sensor means situated in close proximity to said teeth of said tone wheel, said sensor means producing a plurality of pulse signals wherein each of said pulse signals corresponds with each of said teeth and said additional tooth of said tone wheel passing near said sensor means;

circuit means responsive to said pulse signals for producing a reference timing signal indicative of said additional tooth and a subsequent one of said equiangularly spaced teeth passing near said sensor means, wherein said circuit means produces a speed signal corresponding to the quantity of pulse signals detected per unit time, and wherein said circuit means further includes means for measuring the four most recent time intervals between said pulse signals as $T_n$, $T_{n-1}$, $T_{n-2}$, and $T_{n-3}$, wherein $T_n$ is the most recent time interval measured, means for determining that the next pulse detected does not correspond with an equiangular projection immediately following a pulse corresponding to said additional projection if $T_{n-1}$ is substantially larger than $T_n$, and means for producing a timing reference signal upon detection of a subsequent one of said pulses if said speed signal is greater than a predetermined speed limit, that $T_{n-3}$ is greater than ($T_{n-2}$ - a predetermined time value), and that the product of $T_{n-3}$ and a predetermined factor is greater than $T_n$; and wherein said circuit means produces a plurality of reference timing signals in response to receiving said pulse signals, wherein each of said reference timing signals represents a unique predetermined rotational reference position of the camshaft corresponding with a reference timing position for each cylinder of the engine.

6. The apparatus of claim 5 wherein said tone wheel includes 24 equiangular projections.

7. The apparatus of claim 6 wherein said predetermined time value is approximately 3.1 mS, said predetermined speed limit is approximately 300 RPM, and said predetermined factor is approximately 0.875.

8. The device of claim 5 wherein said circuit means produces said speed signal in response to detection of at least four of said pulse signals.

9. A position and speed sensing apparatus for use with an internal combustion engine having a camshaft, said apparatus comprising:

a gear rotating in synchronism with said camshaft, said gear having a plurality of equiangular teeth, said gear further including a timing tooth situated between two adjacent equiangular teeth;

a variable reluctance sensor situated in close proximity with said gear and producing a plurality of timing signals, wherein each of said plurality of timing signals is produced in response to one of said equiangular teeth or said timing tooth passing in close proximity with said sensor;

first circuit means responsive to said plurality of timing signals for producing a speed signal corresponding to the rate of occurrence of said timing signal;

second circuit means responsive to said plurality of timing signals for measuring the most recent time intervals between succeeding ones of said plurality of timing signals as $T_n$, $T_{n-1}$, $T_{n-2}$, and $T_{n-3}$, and producing a timing reference signal in response to detecting the following conditions:

(a) that $T_{n-1}$ is substantially larger than $T_n$; and (b) that said speed signal is greater than a predetermined speed limit.

10. The apparatus of claim 9 wherein said second circuit means produces a timing reference signal when $T_{n-1}$ is substantially larger than $T_n$ and said speed signal is less than said predetermined limit upon detecting the following conditions:

(c) $T_{n-3}$ is greater than the difference between $T_{n-2}$ and a predetermined time interval; and (d) $T_n$ is less than the product of $T_{n-3}$ and a predetermined factor.

11. The apparatus of claim 10, wherein said gear includes 24 equiangular teeth situated 15 degrees apart around the periphery of said gear.

12. The apparatus of claim 11 wherein said timing reference signal is produced when said conditions (a)-(d) inclusive are satisfied and a subsequent timing signal is received from said sensor.

13. The apparatus of claim 12 wherein said predetermined speed limit is approximately 300 RPM, said predetermined time interval is approximately 3.1 mS, and said predetermined factor is approximately 0.875.

14. The apparatus of claim 13 including signal shaping circuitry for amplifying and shaping said timing signals before said timing signals are supplied to said first and said second circuit means, and wherein said first circuit means and said second circuit means are part of a processor means having RAM, ROM, and I/O.

* * * * *